April 22, 1947.   J. J. NEFF   2,419,280
ELECTRONIC GAUGE FOR MEASURING THE RADIAL FREEDOM OF
ANTI-FRICTION BEARINGS IN THEIR RACES
Filed Sept. 11, 1945   2 Sheets-Sheet 1
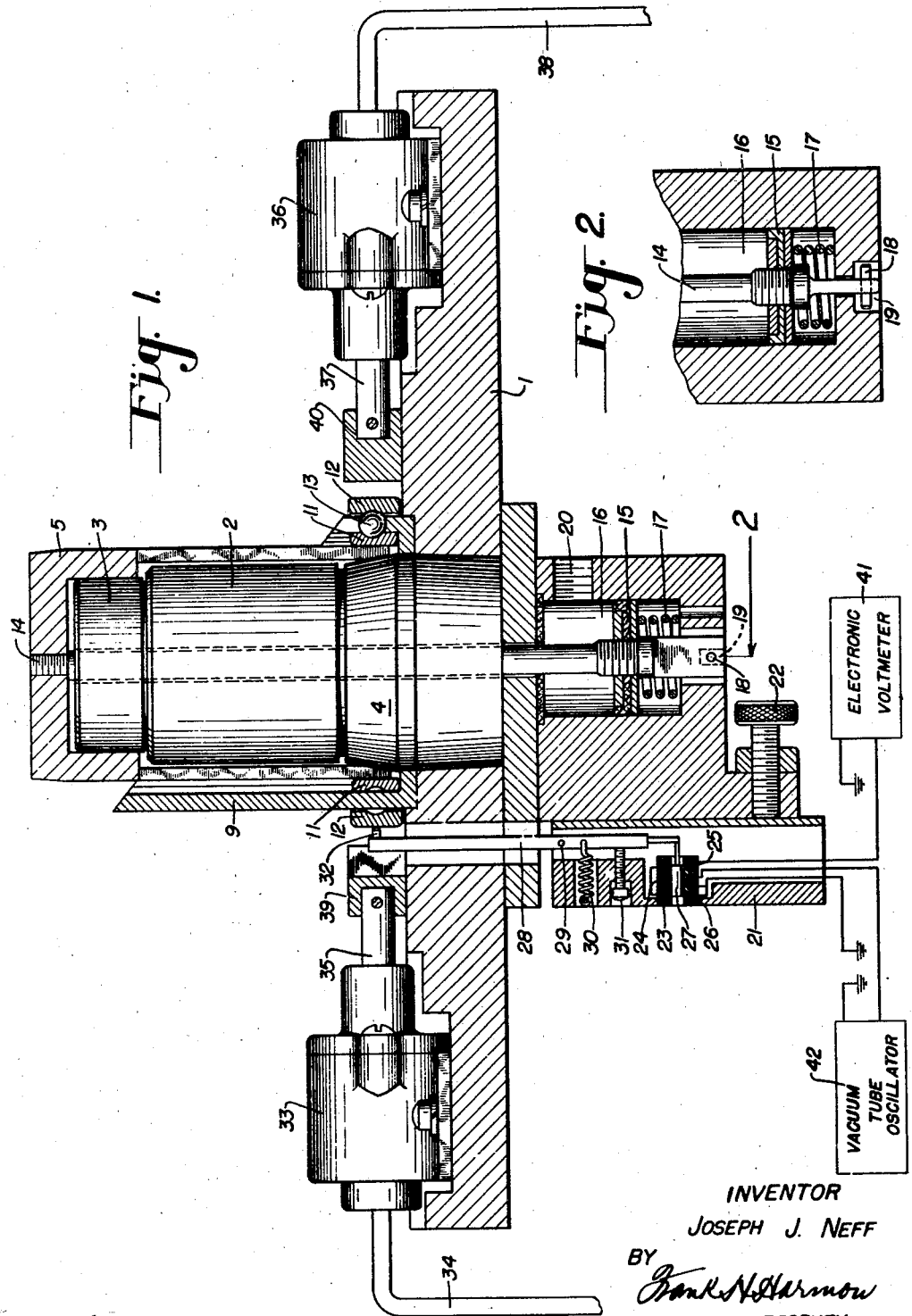
INVENTOR
JOSEPH J. NEFF
BY
Frank N. Harmon
ATTORNEY April 22, 1947.     J. J. NEFF     2,419,280
ELECTRONIC GAUGE FOR MEASURING THE RADIAL FREEDOM OF
ANTI-FRICTION BEARINGS IN THEIR RACES
Filed Sept. 11, 1945     2 Sheets-Sheet 2
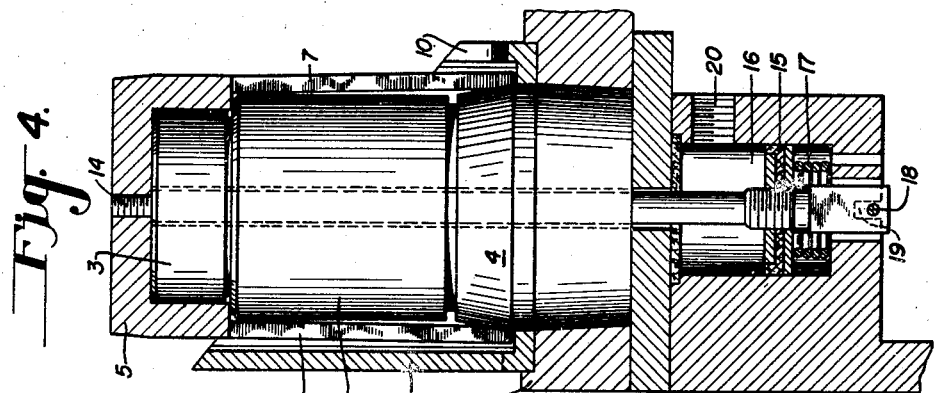
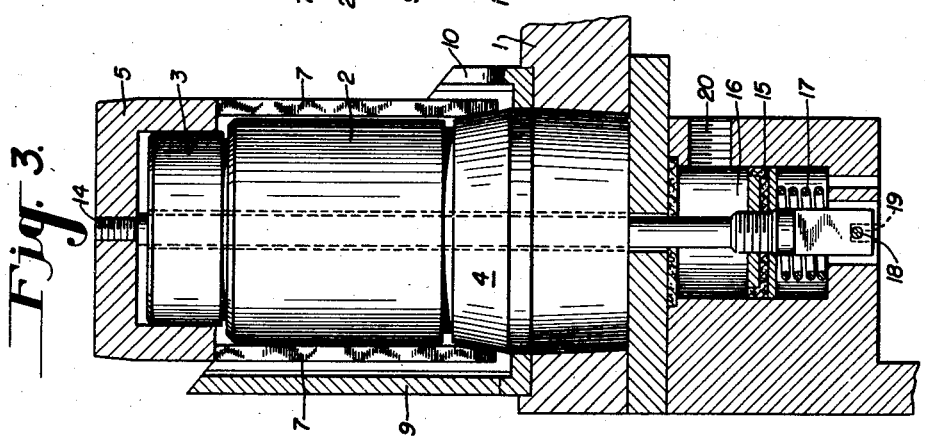
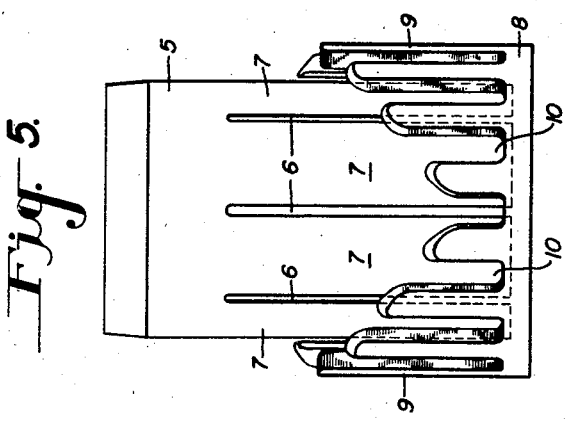
INVENTOR
JOSEPH J. NEFF
BY
*Frank H. Harmon*
ATTORNEY Patented Apr. 22, 1947

2,419,280

UNITED STATES PATENT OFFICE 2,419,280

ELECTRONIC GAUGE FOR MEASURING THE RADIAL FREEDOM OF ANTIFRICTION BEARINGS IN THEIR RACES

Joseph J. Neff, South Euclid, Ohio, assignor, by mesne assignments, to Jack & Heintz Precision Industries, Inc., Cleveland, Ohio, a corporation of Delaware Application September 11, 1945, Serial No. 615,668

6 Claims. (Cl. 33—143)

1

This invention relates to precision gauges and has for one of its primary objects to provide an electronic gauge whereby the radial freedom between the inner and outer race of an antifriction bearing assembly and the bearings embraced thereby, or in other words, the radial looseness of the antifriction bearings while installed between the inner and outer race but before being caged, may be readily checked and measured.

With the foregoing and other objects in view the invention resides in the combination of parts and in the details of construction set forth in the following description and appended claims, certain embodiments thereof being shown in the accompanying drawings, in which:

Figure 1 is a view partly in elevation and partly in vertical section, showing the device to include a work support comprising a clamping means for the inner race, a support for the outer race, a ball separating and positioning member therebetween, a pair of opposed and alternately operated radial pressure members for engaging the outside of the outer race, a stylus for engaging the periphery of the outer race, a displacement pick-up mechanism the armature of which is operated by the stylus and a vacuum tube oscillator and electronic voltmeter circuit;

Figure 2 is a detail view in vertical section of a pneumatically operated piston comprising part of the mechanism for effecting the clamping of the inner race, the section being taken at right angles to that of Figure 1;

Figure 3 is a view partly in elevation and partly in vertical section of the work supporting mechanism without the work and showing the inner race clamping collet in contracted, or non-clamping, position and the operating piston in an upper position;

Figure 4 is a view similar to Figure 3, showing the inner race clamping collet in an expanded and race clamping position and the operating piston in a downward position; and Figure 5 is an enlarged detail view in elevation of the inner race clamping collet and the surrounding ball separator and positioner.

The specific purpose of the device illustrated in the drawings is to provide a gauge for measuring radial freedom between the inner and outer race of an anti-friction bearing assembly and the bearings embraced thereby, or in other words, the radial looseness of the anti-friction bearings therein before being caged. Generally speaking, it is proposed to accomplish this by providing collet means for releasably clamping the inner race in a fixed position. About this collet

2 is arranged to ball separator and positioner having a plurality of vertical slots into which the balls separately fall while still engaging the grooves of the inner and outer races. A pair of diametrically opposed pressure plungers are alternately operated to engage by pressure the outer surface of the outer race as a flexibly mounted stylus is in resilient contact with such surface. The stylus is a component part of an electric displacement pickup unit and a vacuum tube oscillator and electronic voltmeter circuit of a similar type to that employed in the United States patent to Joseph J. Neff, No. 2,361,788, October 31, 1944, for Displacement pickup.

Referring more particularly to the drawings, the device is supported by a base 1 which supports a shaft generally indicated at 2 and having an upper portion 3 of reduced diameter and a lower portion that is bevelled at 4 to increase in diameter downwardly. Surrounding this shaft is a hollow collet device including a cap piece 5 that fits over the upper shaft portion 3. The remaining portion of the hollow collet is provided with a plurality of vertical slots 6 to form a plurality of expansible collet tongues 7. Surrounding the collet in spaced relationship is a member 8, that is rigid with the base, for separating and positioning of the balls and which includes a plurality of different length prongs 9 between which are equally sized upwardly open slots 10 each to receive a separate ball.

The arrangement just described is such that the bearing assembly, including the inner race 11 and the outer race 12 with the balls 13 within the two races but as yet uncaged, is passed over the top of the collet so that the inner race is between the collet tongues 7 and the ball separator 8 and the outer race surrounds the lower portion of separator 8 as each ball occupies a separate groove 10 between prongs 9 of the ball separator. This is possible when the collet tongues 7 are in the upper position on shaft bevel 4 as shown in Figure 3.

For purposes of clamping the inner race in position for measurement of radial freedom, or radial looseness of the balls in the inner and outer races, there is provided a rod 14 that extends through the shaft to be secured to the cap 5 of the collet. This rod 14 carries a piston 15 in a cylinder 16 in the base 1. The piston rests on a compression coil spring 17 in the lower portion of the cylinder and the rod 14 carries a cross pin 18 that rides in a guide slot 19 in the base which also acts as a limit stop for longitudinal movement of rod 14. The screw-threaded opening 20 into cylinder 15 above piston 16 serves as an inlet for supplying air pressure, under suitable manually controlled valve means, not shown, to force piston 16 downwardly against the action of spring 17 into the position shown in Figure 4. This action, through rod 14, pulls the collet downwardly causing the collet tongues 7 to ride downwardly on shaft bevel 4 and expand against the inner surface of the inner race and clamp the same against the inner surface of the ball positioner 8. Operation of the same suitable valve means, not shown, to release the supply of air pressure through inlet 20 to cylinder 15, permits spring 17 to force collet 15 with its tongues 7 upwardly and out of clamping engagement with inner race 11 so that the bearing assembly, after measurement, may be easily removed and another inserted for measurement.

As stated before, the measuring device includes an electric displacement pickup unit with a housing 21 suitably connected to the base. Inside of this housing is a coil form 23 for supporting a driving coil 24 and a pickup coil 25 on one side and a pickup coil 26 on the other side of the driving coil, the windings of the three coils being coaxially arranged. An armature 27 is mounted inside the coils for longitudinal movement therein and carries a stylus 28 pivoted at 29. A tension coil spring 30 is provided to urge the stylus in a clockwise direction about its pivot and an adjustable screw bolt 31 is provided to act as a limit stop of such clockwise pivoting of the stylus. The stylus has a stylus point, or ball, 32 which rests on the outer surface of the outer race 12.

In order to provide a double check on the radial freedom of the outer race, or the radial looseness of the balls while installed between the inner and outer race but before being placed in a conventional ball cage, there is provided on the base on one side of the bearing assembly support a suitable air cylinder 33 and piston having a piston rod 35 and an air inlet tube 34 from a suitable source of pressure air. On the other side is a similar air cylinder 36, a piston having a piston rod 37 and an air inlet tube 38 from the same pressure air source. Operation of a suitable manual valve means, not shown, in one direction will cause piston 35 to move to the right to bring pressure member 39 into radial pressure engagement with the outer surface of the outer race. A reverse movement of the manual valve means will release such pressure and cause piston rod 37 to move to the left to bring pressure member 40 into radial pressure engagement with the opposite side of the outer race.

The armature 27 is first adjusted to be properly centered electrically with respect to the three coils 24, 25 and 26 so that the voltages induced in pickup coils 25 and 26 by driving coil 24 are in opposition as a result of the coil connections thereby neutralizing the effect of the pickup mechanism on the voltmeter 41. Measurement by the instrument is dependent upon the position of the armature within the three coils. Thumb nut 22 provides for an adjustment of the pickup unit with respect to the base and the stylus with respect to the outer race. When the driving coil 24 receives a signal from the vacuum tube oscillator 42, opposing voltages are set up in pickup coils 25 and 26. If when the stylus point engages the outer surface of the outer race 12, while member 39 or member 40 is brought into pressure engagement with the outer race, there is radial freedom or looseness of the balls in the races, the stylus is forced to pivot in a clockwise or counterclockwise direction respectively, and the armature is accordingly displaced from its electrical center with respect to the coils. More voltage will accordingly be induced in one pickup coil than in the other, resulting in a corresponding reading on the dial of the electronic voltmeter.

I claim:

1. In an electrical measuring instrument for measuring the radial clearance of ball bearings between the inner and outer races of a bearing assembly prior to caging of said bearings, a radially expansible collet, a ball separating and positioning member comprising a cylinder surrounding said collet in spaced relationship and having a plurality of open ended slots each to separately receive a ball as the ball bearing assembly is placed in position for measurement with its outer race surrounding said ball positioning cylinder and said inner race interposed between said cylinder and said collet, means for expanding said collet to grip said inner race between said collet and said ball positioning cylinder, means for applying a pressure radially inwardly on the outer surface of said outer race, a pivoted flexibly mounted stylus to resiliently engage the outer surface of said outer race, an electric displacement pickup unit including an armature carried by said stylus.

2. In an electrical measuring instrument for measuring the radial clearance of ball bearings between the inner and outer races of a bearing assembly prior to caging of said bearings, a radially expansible collet, a ball separating and positioning member comprising a cylinder surrounding said collet in spaced relationship and having a plurality of open ended slots each to separately receive a ball as the ball bearing assembly is placed in position for measurement with its outer race surrounding said ball positioning cylinder and said inner race interposed between said cylinder and said collet, means for expanding said collet to grip said inner race between said collet and said ball positioning cylinder, plunger means for applying a pressure radially inwardly alternately on opposite sides of the outer surface of said outer race, a pivoted flexibly mounted stylus on one side of said outer race in line with said plunger means to resiliently engage the outer surface of said outer race, an electric displacement pickup unit including an armature carried by said stylus.

3. In an electrical measuring instrument for measuring the radial clearance of ball bearings between the inner and outer races of a bearing assembly prior to caging of said bearings, a base, a shaft having a bevelled portion, a collet surrounding and attached to said shaft and having radially expansible tongues, a ball separating and positioning member comprising a cylinder surrounding said collet in spaced relationship and having a plurality of open ended slots each to separately receive a ball as the ball bearing assembly is placed in position for measurement with its outer race surrounding said ball positioning cylinder and said inner race interposed between said cylinder and said collet tongues, means for pulling said collet to expand its tongues about the bevelled portion of said shaft to grip said inner race between said tongues and said ball positioning cylinder, means for applying a pressure radially inwardly on the outer surface of said outer race, a pivoted flexibly mounted stylus to resiliently engage the outer surface of said outer race, an electric displacement pickup unit including an armature carried by said stylus.

4. In an electrical measuring instrument for measuring the radial clearance of ball bearings between the inner and outer races of a bearing assembly prior to caging of said bearings, a base, a shaft having a bevelled portion, a collet surrounding and attached to said shaft and having radially expansible tongues, a ball separating and positioning member comprising a cylinder surrounding said collet in spaced relationship and having a plurality of open ended slots each to separately receive a ball as the ball bearing assembly is placed in position for measurement with its outer race surrounding said ball positioning cylinder and said inner race interposed between said cylinder and said collet tongues, means for pulling said collet to expand its tongues about the bevelled portion of said shaft to grip said inner race between said tongues and said ball positioning cylinder, plunger means for applying a pressure radially inwardly alternately on opposite sides of the outer surface of said outer race, a pivoted flexibly mounted stylus on one side of said outer race in line with said plunger means to resiliently engage the outer surface of said outer race, an electric displacement pickup unit including an armature carried by said stylus.

5. In an electrical measuring instrument for measuring the radial clearance of ball bearings between the inner and outer races of a bearing assembly prior to caging of said bearings, a radially expansible collet, a ball separating and positioning member comprising a cylinder surrounding said collet in spaced relationship and having a plurality of open ended slots each to separately receive a ball as the ball bearing assembly is placed in position for measurement with its outer race surrounding said ball positioning cylinder and said inner race interposed between said cylinder and said collet, means for expanding said collet to grip said inner race between said collet and said ball positioning cylinder, a pair of pressure plungers alternately operable to apply a pressure on opposite sides of the outer surface of said outer race, a pivoted flexibly mounted stylus on one side of said outer race in line with said plungers to resiliently engage the outer surface of said outer race, an electric displacement pickup unit including an armature carried by said stylus.

6. In an electrical measuring instrument for measuring the radial clearance of ball bearings between the inner and outer races of a bearing assembly prior to caging of said bearings, a base, a shaft having a bevelled portion, a collet surrounding and attached to said shaft and having radially expansible tongues, a ball separating and positioning member comprising a cylinder surrounding said collet in spaced relationship and having a plurality of open ended slots each to separately receive a ball as the ball bearing assembly is placed in position for measurement with its outer race surrounding said ball positioning cylinder and said inner race interposed between said cylinder and said collet tongues, pneumatic means for pulling said collet to expand its tongues about the bevelled portion of said shaft to grip said inner race between said tongues and said ball positioning cylinder, a pair of pneumatic pressure plungers alternately operable to apply a pressure on opposite sides of the outer surface of said outer race, a pivoted flexibly mounted stylus on one side of said outer race in line with said plungers to resiliently engage the outer surface of said outer race, an electric displacement pickup unit including an armature carried by said stylus.

JOSEPH J. NEFF.

REFERENCES CITED

The following references are of record in the file of this patent:

UNITED STATES PATENTS

| Number | Name | Date |
| --- | --- | --- |
| 1,391,509 | Rouanet | Sept. 20, 1921 |
| 1,550,671 | Brault | Aug. 25, 1925 |
| 2,122,664 | Terry | July 5, 1938 |
| 2,361,788 | Neff | Oct. 31, 1944 |